United States Patent
Nguyen

(10) Patent No.: US 7,108,139 B2
(45) Date of Patent: Sep. 19, 2006

(54) PLASTIC EXTRUDED CENTER TUBE PROFILE AND METHOD OF MANUFACTURE

(75) Inventor: Ledu Quoc Nguyen, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 301 days.

(21) Appl. No.: 10/382,569

(22) Filed: Mar. 6, 2003

(65) Prior Publication Data

US 2004/0173520 A1   Sep. 9, 2004

(51) Int. Cl.
*B01D 29/21*   (2006.01)

(52) U.S. Cl. .......................... 210/437; 55/498; 55/521; 210/457; 210/483; 210/493.1

(58) Field of Classification Search ............... 210/437, 210/435, 457, 483, 484, 493.1, 497.1–2, 210/497.01, 497.2, 438, 456, 183–186; 55/497, 55/498, 520, 521, 456, 457; 138/37–39; 165/109.1, 177–182
See application file for complete search history.

(56) References Cited

U.S. PATENT DOCUMENTS

| | | | | |
|---|---|---|---|---|
| 2,895,508 A | * | 7/1959 | Drake | 138/38 |
| 3,502,218 A | * | 3/1970 | Tuffnell et al. | 210/305 |
| 3,633,343 A | * | 1/1972 | Mark | 96/118 |
| 3,636,982 A | * | 1/1972 | Drake | 138/38 |
| 3,750,889 A | * | 8/1973 | Acosta | 210/497.01 |
| 4,190,105 A | * | 2/1980 | Dankowski | 165/179 |
| 4,806,086 A | | 2/1989 | Bloch et al. | |
| 4,926,933 A | * | 5/1990 | Gray | 165/173 |
| 5,601,717 A | * | 2/1997 | Villette et al. | 210/493.1 |
| 5,985,144 A | * | 11/1999 | Janik et al. | 210/233 |
| 6,105,664 A | * | 8/2000 | Gillbrand et al. | 165/119 |
| 6,206,090 B1 | * | 3/2001 | Rago | 165/119 |

FOREIGN PATENT DOCUMENTS

| | | |
|---|---|---|
| CN | 2316119 Y | 4/1999 |
| DE | 44 30 341 A1 | 3/1995 |

OTHER PUBLICATIONS

German Office Action dated Jun. 6, 2006 (Four (4) pages).

* cited by examiner

*Primary Examiner*—Joseph Drodge
(74) *Attorney, Agent, or Firm*—Crowell & Moring LLP

(57) ABSTRACT

A filter for a fluid system includes a housing having an interior cavity. A filter media is disposed in the housing and defines a central opening. A center tube is arranged within the central opening and includes a plurality of helical fins extending radially outwardly from a central portion of the center tube. The helical fins terminate in an outer portion that is adjacent to the filter media. The center tube provides the desired structural integrity while permitting fluid to flow through the center tube. The present invention center tube is produced by a plastic extrusion process.

12 Claims, 6 Drawing Sheets

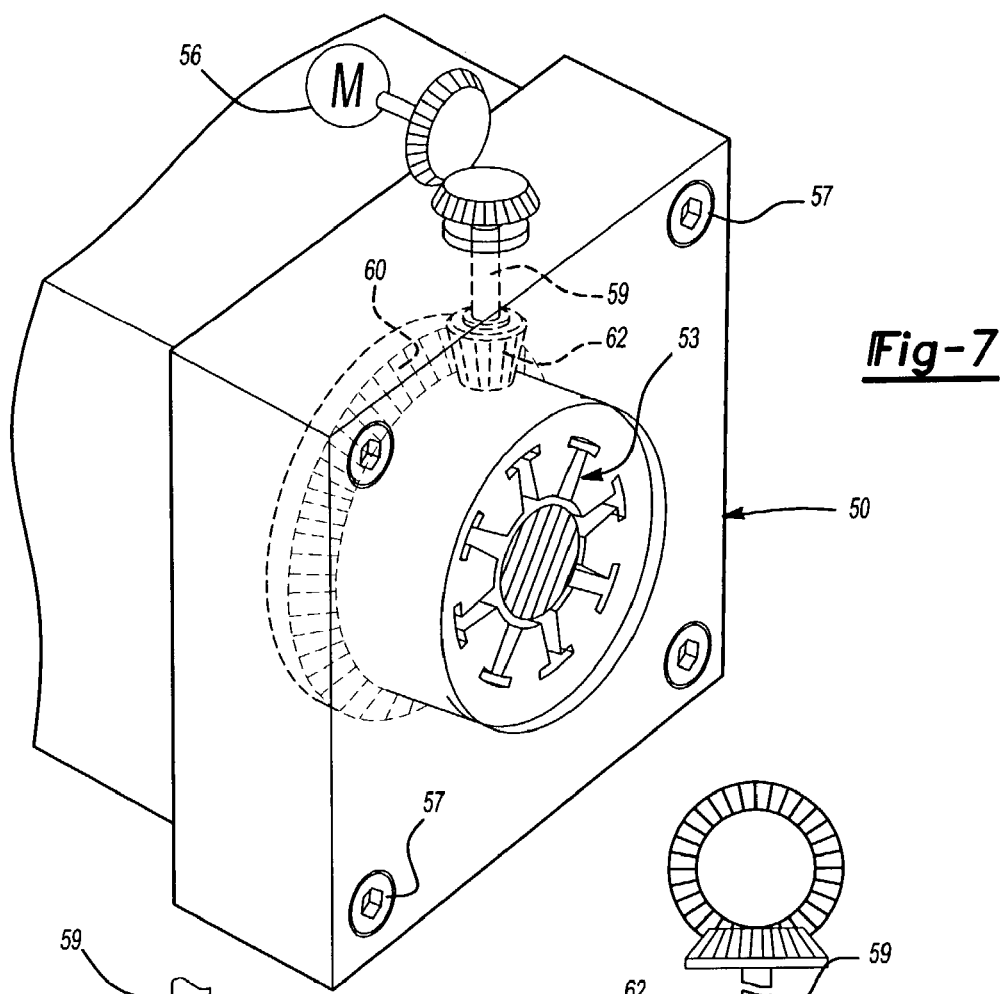
*Fig-7*
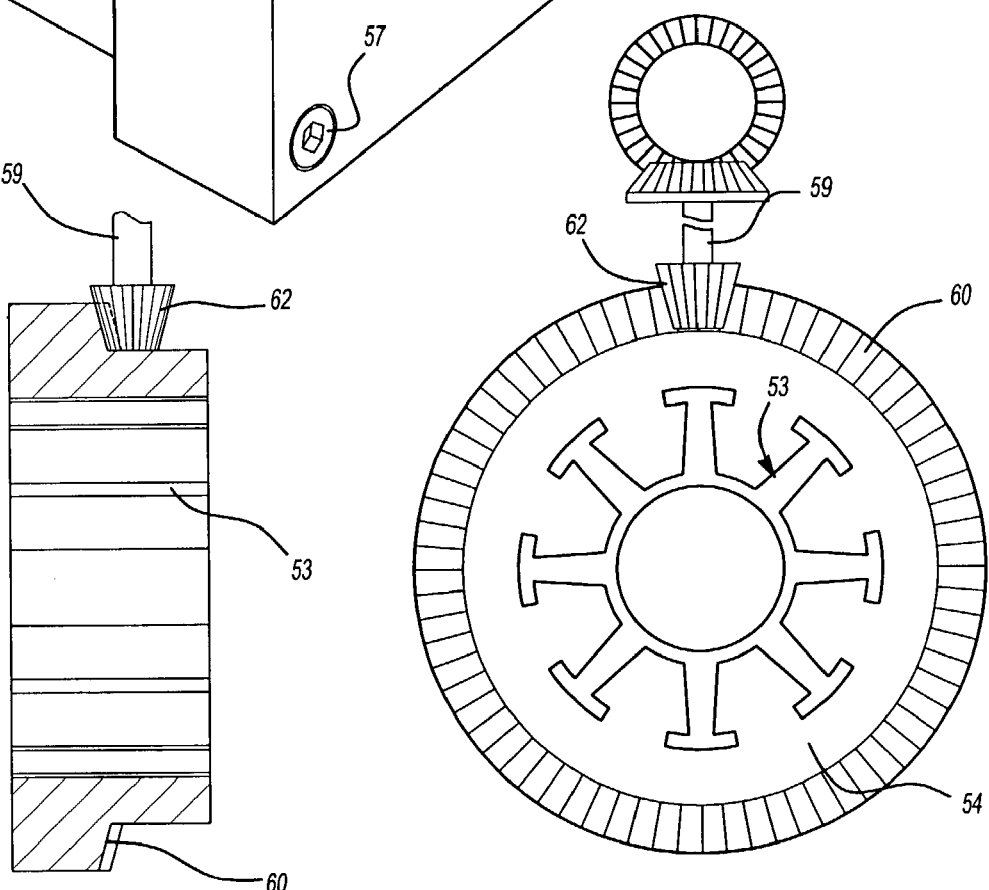
*Fig-9*    *Fig-8*

PLASTIC EXTRUDED CENTER TUBE PROFILE AND METHOD OF MANUFACTURE

BACKGROUND OF THE INVENTION

This invention relates to a filter for use in fluid systems, and more particularly, the invention relates to a center tube commonly used in filters.

Filters are typically constructed from a housing of one or more components secured to one another. A filter media, which is typically a pleated type filter media, is disposed within an interior cavity of the housing. The filter media is typically cylindrical in shape with the exterior of the filter media defining an input side through which dirty fluid enters. The interior of the filter media defines an outlet side that receives a clean fluid.

A center tube is typically arranged centrally within the filter relative to the filter media to hold the shape of the filter media and provide strength to the filter. The center tube is typically constructed from metal. Center tubes of different diameters and lengths are produced for various sized filters. As a result, a high inventory of center tubes is required for the different filters. Furthermore, numerous individual dies, rollers and sealing equipment are required for producing each of the center tubes for the various filters.

Therefore, what is needed is a center tube that permits the flow of fluid therethrough while being able to accommodate different diameters and lengths needed for the various filters.

SUMMARY OF THE INVENTION AND ADVANTAGES

A filter for a fluid system includes a housing having an interior cavity. A filter media is disposed in the housing and defines a central opening. A center tube is arranged within the central opening and includes a plurality of helical fins extending radially outwardly from a central portion of the center tube. The helical fins terminate in an outer portion that is adjacent to the filter media. The center tube provides the desired structural integrity while permitting fluid to flow through the center tube.

The present invention center tube is produced by a plastic extrusion process. Specifically, a plastic extruding machine is provided that has a plate which defines a desired shape. In one embodiment, the desired shape may be of a star-shape to provide the center tube having the helical fins mentioned above. The plate is rotated and plastic is extruded through the plate to produce the helical twist. A center tube is provided with a helical outer circumferential surface that is adapted to be disposed within the filter media. Alternatively, a helical coil may be produced from a plate having a shape of an inclined arcuate portion.

Accordingly, the above provides a center tube that permits the flow of oil therethrough while being able to accommodate different diameters and lengths needed for the various filters.

BRIEF DESCRIPTION OF THE DRAWINGS

Other advantages of the present invention can be understood by reference to the following detailed description when considered in connection with the accompanying drawings wherein:

FIG. 7 is a perspective view of a die assembly used to produce the center tube shown in FIG. 5A;

FIG. 8 is an end view of a profile plate;

FIG. 9 is a cross-sectional view of the profile plate shown in FIG. 8;

DETAILED DESCRIPTION OF THE PREFERRED EMBODIMENT

Figure 1:
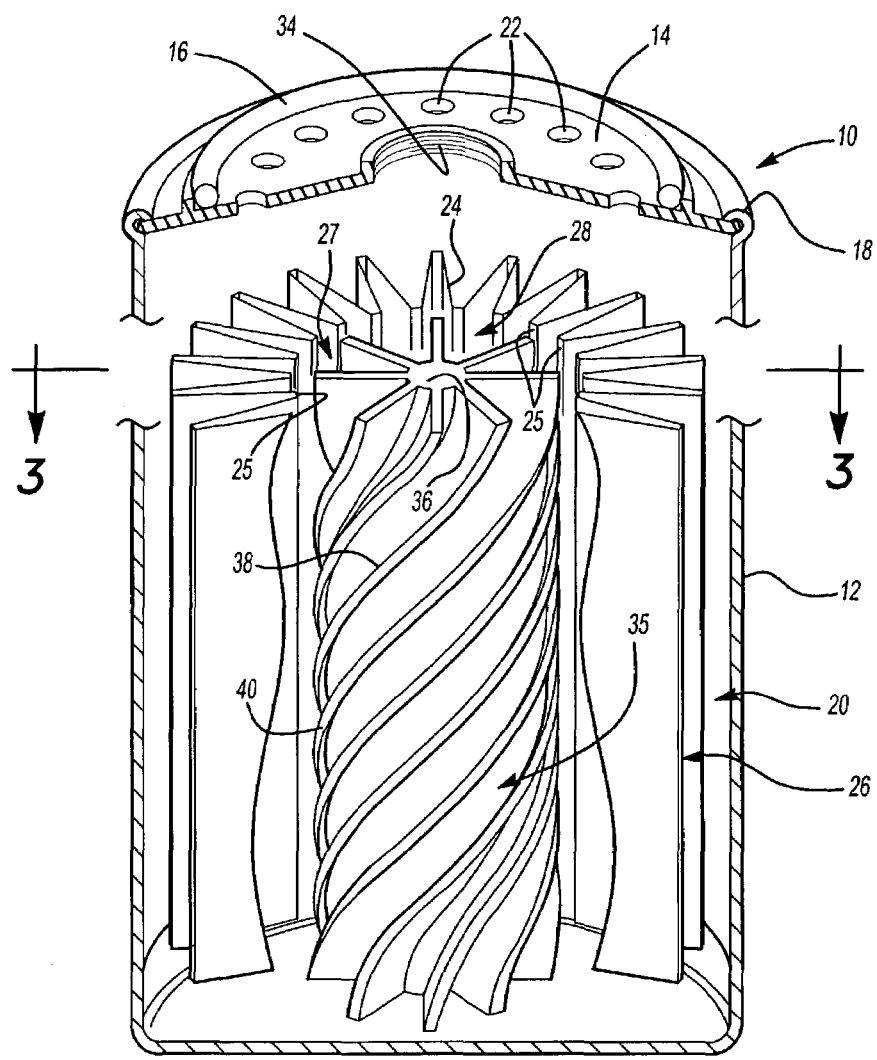
FIG. 1 is a partial cross-sectional perspective view of the present invention filter.
Figure 2:
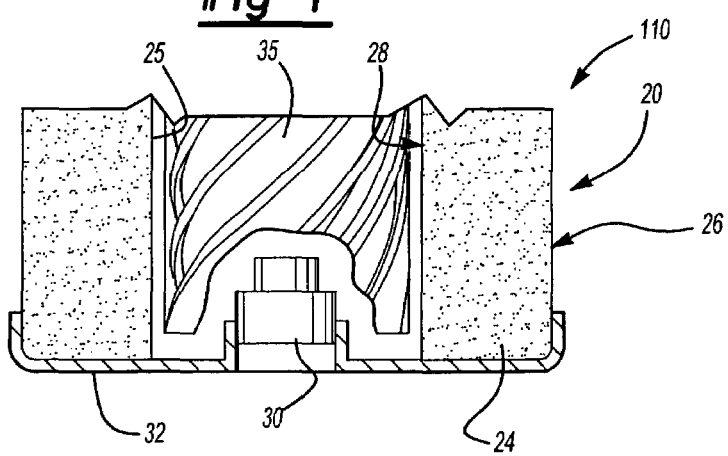
FIG. 2 is a cross-sectional view of the present invention applied to a filter cartridge.

A filter 10, is shown in FIG. 1 and as 110 in FIG. 2, is typically used for filtering fluid such as in a lubrication system for an engine. The filter 10 includes a can or housing 12 that may be constructed from one or more components secured to one another. For example, a nut plate 14 may be secured to an outer cylindrical wall portion with a seam 18. An O-ring 16 is placed on the nut plate 14 to seal between the filter 10 and a mounting adaptor (not shown).

The filter 10 includes an interior cavity 20 with a filter media 24 disposed within the cavity 20 to filter debris from the fluid so that clean fluid may be returned to the engine, such as for lubrication of engine components. The filter media 24 may be of a generally cylindrical shape and is typically pleated to form inner edges 25 that define a central opening 27. The filter media 24 is typically retained between end caps, which are not shown for clarity. The filter media 24 has an inlet side 26 that receives dirty fluid and an outlet side 28 where clean fluid exits the filter media 24. The nut plate 14 may include perforations 22 to permit dirty fluid to enter the filter 10. Nut plate 14 may also include a threaded aperture 34 that is used to secure the filter 10 to the mounting adaptor. The clean fluid exits the central opening 27 through the threaded aperture 34 and into the mounting adaptor. It should be understood that the fluid flow may be reversed from that described above.

FIG. 2 depicts a cartridge type filter 110 typically located within a suitable fixed housing (not shown). The filter media 24 is retained between spaced apart end discs 32 (only one of which is shown), such that the outer perimeter of the filter media 24 is left exposed. A bypass valve may be arranged within the filter 110 in any suitable manner as is well known in the art to permit oil to travel from the inlet side 26 to the outlet side 28 when the filter media 24 has been clogged. It should be understood that the filter arrangement 10 shown in FIG. 1 may also include a bypass valve as desired. Moreover, it is to be understood that the present invention center tube, discussed below, may be used in any suitable filter configuration.

Figure 3:
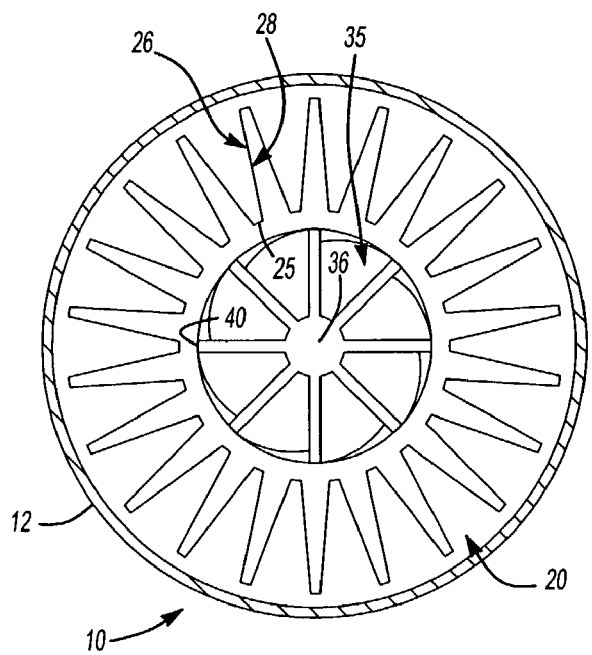
FIG. 3 is a cross-sectional view of the filter shown in FIG. 1 taken along lines 3—3.
Figure 4:
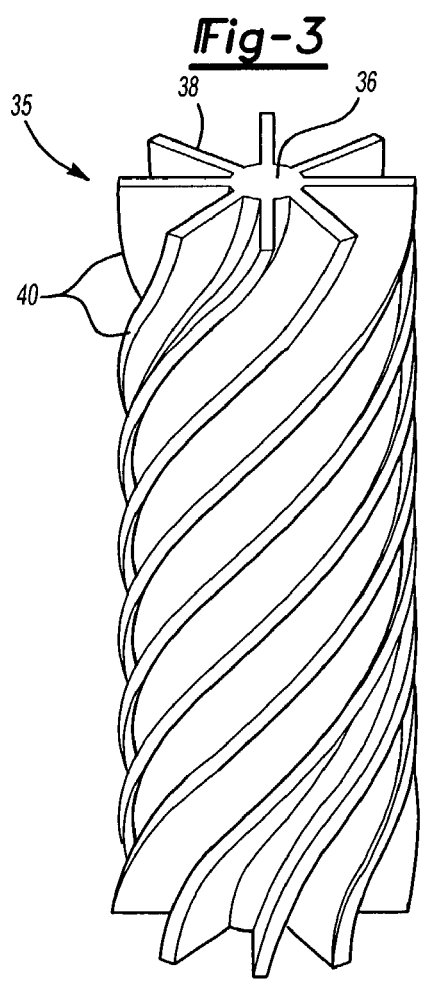
FIG. 4 is a perspective view of one embodiment of the present invention center tube.
Figure 5A:
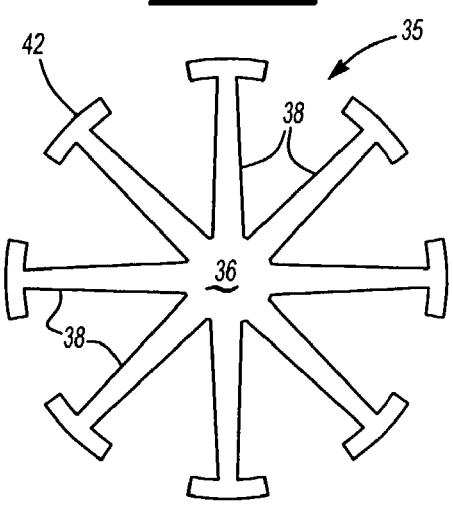
FIG. 5A is a cross-section of an alternative center tube.
Figure 5B:
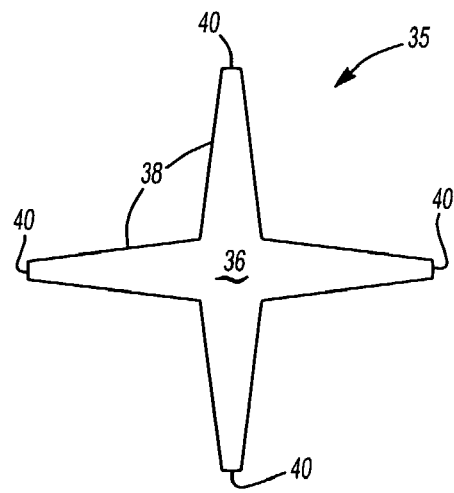
FIG. 5B is a cross-section of yet another present invention center tube.
Figure 5C:
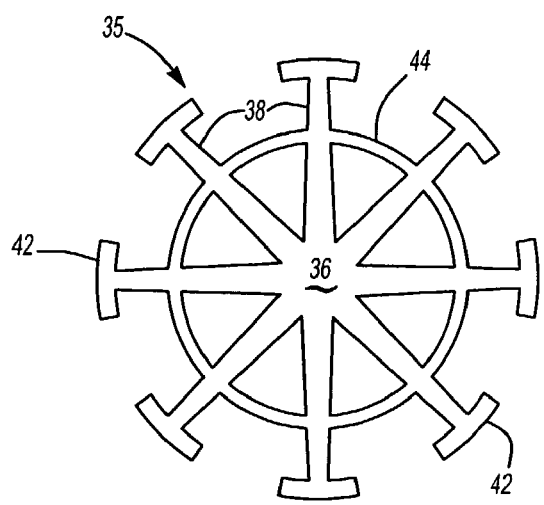
FIG. 5C is a cross-section of yet another embodiment of the present invention center tube.

A center tube 35 is disposed within the central opening 27 to provide structural integrity to the filter 10 and 110 and permit fluid to pass through the center tube 35 to the mounting adaptor. The center tube 35 is arranged proximate to the filter media 24 to provide support to its inner edges 25 to maintain the shape of the filter media 24. Referring to FIGS. 3 and 4, a center tube 35 includes a central portion 36 that may be any desirable shape. Helical fins 38 extend radially outwardly from the central portion 36 and terminate in an outer portion 40 that is arranged proximate to the inner edges 25. While the center tubes 35 depicted in FIGS. 4 and 5A–5C are a star-shape, it is to be understood that any suitable shape center tube 35 may be used. The center tube 35 may be designed as shown in FIG. 5A to include tabs 42 at the outer extremity of the helical fins extending slightly circumferentially in opposite directions therefrom to provide a larger surface by which the inner edges 25 are supported. Although eight helical fins 38 are shown in FIGS. 4 and 5A, it is to be understood that any number of fins may be used. For example, FIG. 5B depicts four helical fins 38. Additionally, an annular wall 44 may be arranged between the helical fins 38, as shown in FIG. 5C, to provide additional structural rigidity to the center tube 35.

Figure 6:
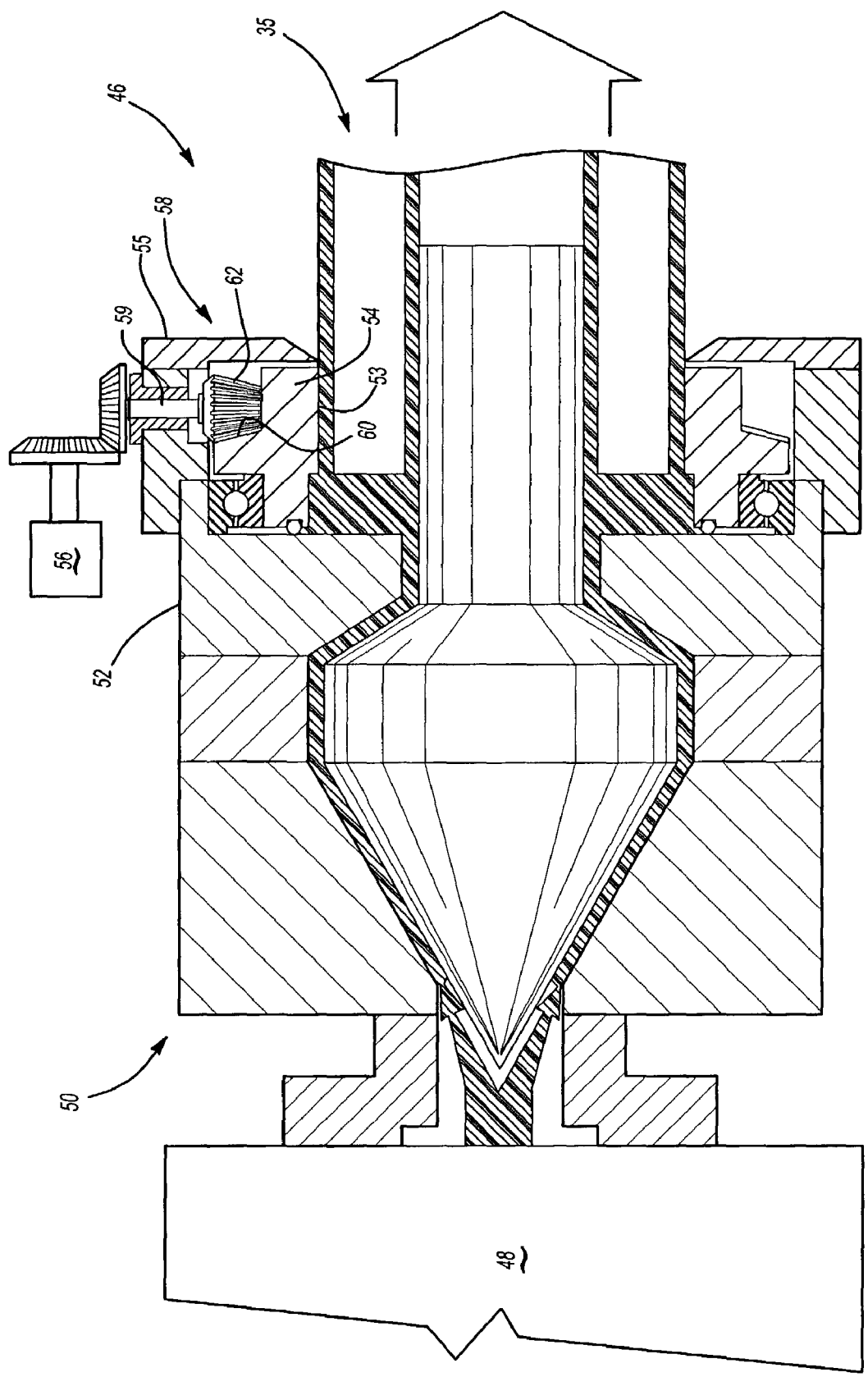
FIG. 6 is a schematic view of a manufacturing process used to produce the present invention center tube.

Preferably, the center tube 35 of the present invention is constructed from a plastic. The center tube 35 may be produced by a manufacturing process 46 schematically depicted in FIG. 6. An extrusion machine 48 extrudes plastic through a die assembly 50. The die assembly 50 includes a member 52 to which an end plate 55 is secured by fasteners 57, as best shown in FIG. 7. A profile plate 54 having a desired shape 53 is disposed between the member 52 and the end plate 55. The shape 53 defines the cross-section of the center tube 35. Referring to FIGS. 7-9 motor 56 and gear assembly 58 drive the profile plate 54 via a shaft 59 to rotate the plate 54 to produce the desired helical twist of the fins 38 of the center tube 35. More specifically, the profile plate 54 may include a ring gear 60 defined by an outer circumference of the profile plate 54. A beveled gear 62 supported on the shaft 59 rotationally couples the motor 56 to the plate 54 to drive the profile plate 54.

Figure 10:
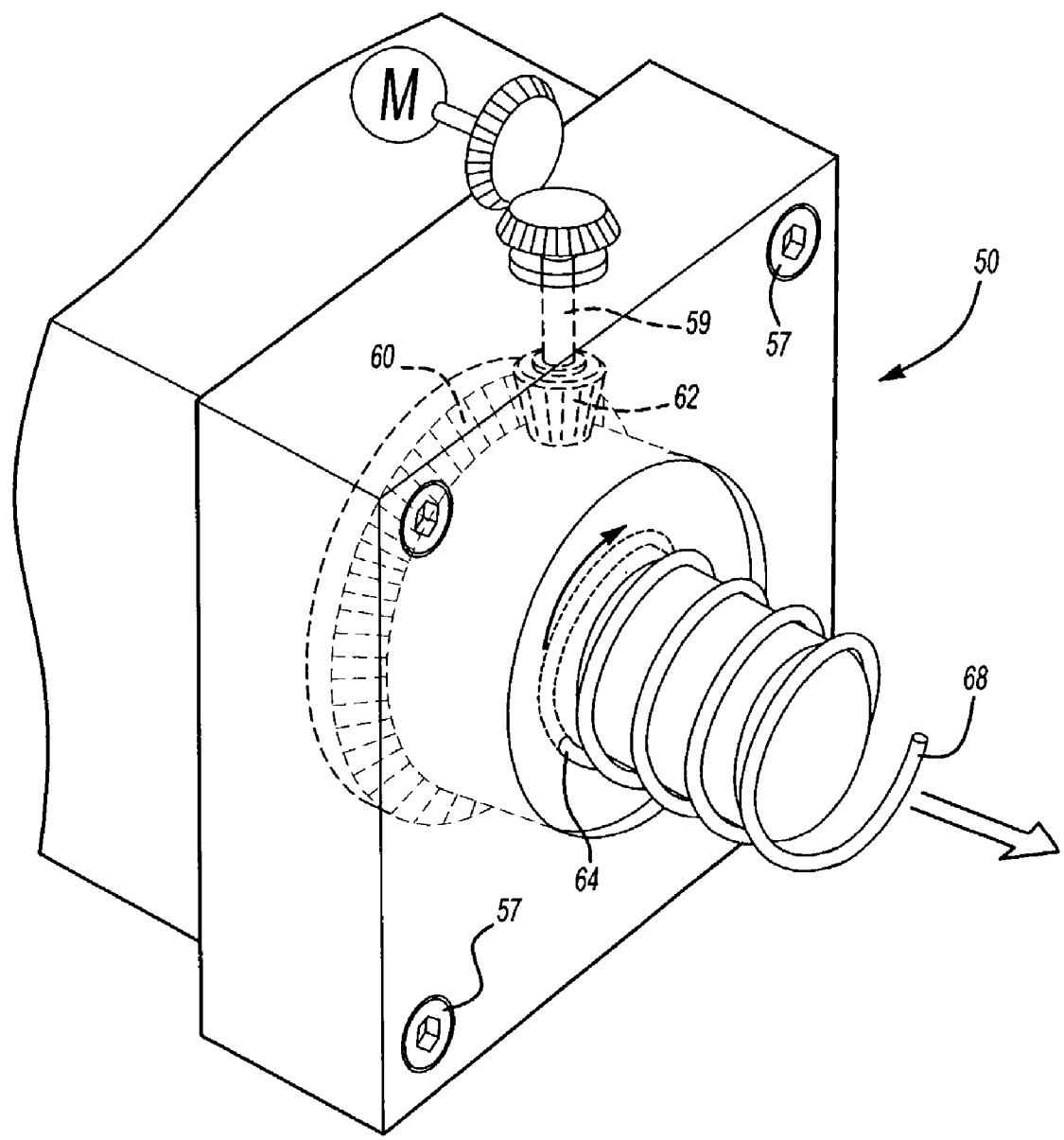
FIG. 10 is a perspective view of another die assembly.
Figure 11:
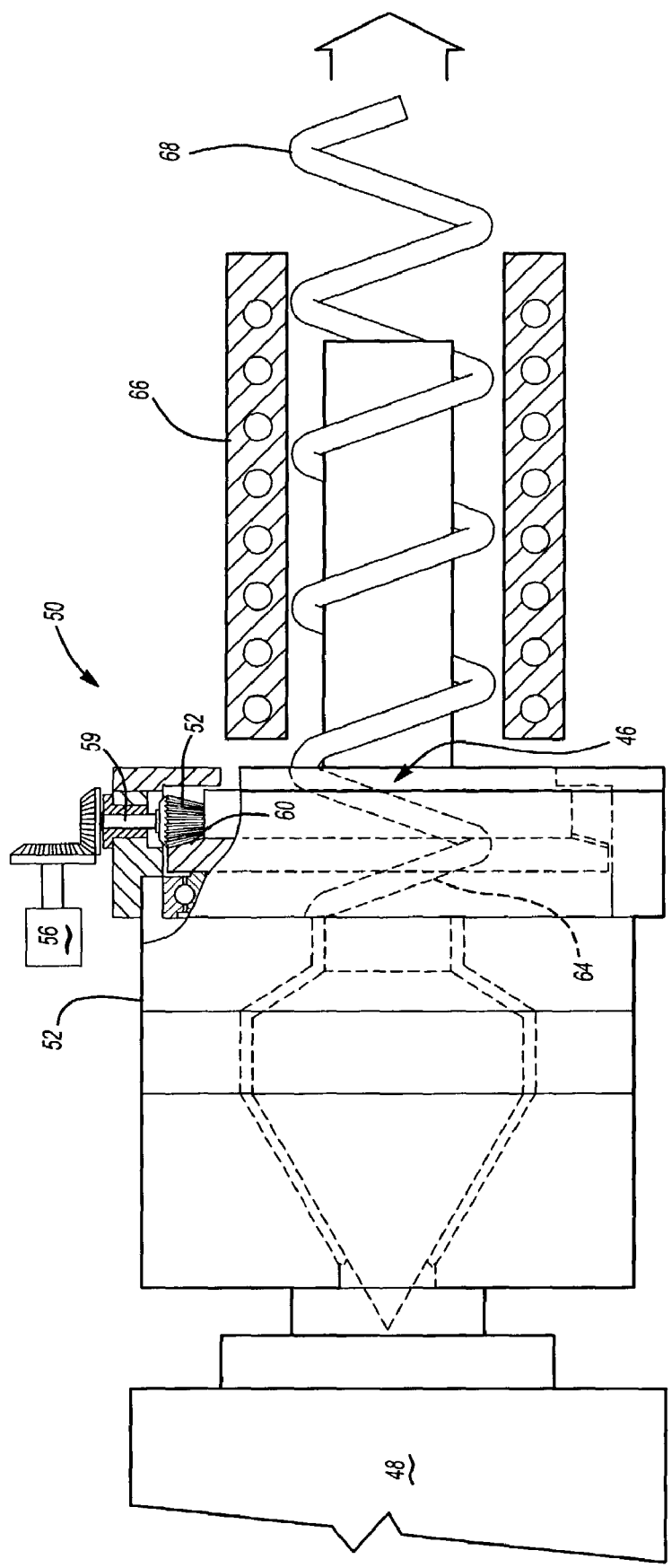
FIG. 11 is a schematic view of another manufacturing process used to produce a helical coil center tube.

In another manufacturing process 46 depicted in FIGS. 10 and 11, plastic is extruded through the extrusion machine 48. The die assembly 50 includes an end plate 55 secured to the member 52 by fasteners 57. A profile plate 54 having a desired shape 64 is arranged between the member 52 and the end 55. The shape 64 may be an inclined arcuate portion such that when the profile plate 54 is rotated, a helical coil is produced similar to a helical spring, which is depicted by helical coil 68 in FIG. 11. A cooling fixture 66 may be used in conjunction with the extrusion machine 48 to lower the temperature of the hot extruded coil to retain the desired shape until it is sufficiently cured. The plastic extruded center tubes may be cut to the desired length. Furthermore, the profile plate 54 may be changed to produce a center tube 35 of different diameters. In this manner, the numerous specialized machines for the filters used in the prior art metal center tubes are no longer required.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A filter for a filter system comprising:
A housing having an interior cavity;
a filter media disposed in said interior cavity, and defining a central opening; and
a center tube disposed in said central opening, said center tube having a plurality of helical fins extending radially outwardly from a central portion with said helical fins each terminating in an outer portion proximate to said filter media, wherein said filter media is pleated forming inner edges proximate to said outer portions, such that said center tube outer portions provide support to said filter media inner edges to maintain the shape of the filter media.

2. The filter according to claim 1, wherein said filter media includes inlet and outlet sides with said center tube disposed on said outlet side.

3. The filter according to claim 1, wherein said center tube has a generally star-shaped cross-section.

4. The filter according to claim 1, wherein said center tube includes at least four helical fins.

5. The filter according to claim 1, wherein said center tube includes an annular wall arranged about said central portion with said helical fins extending radially outwardly from said annular wall away from said central portion.

6. The filter according to claim 1, wherein said outer portion is defined by tabs extending circumferentially from an end of said helical fins.

7. A center tube in combination with an oil filter media comprising:
a pleated filter media having inner edges; and
a center tube having a plurality of helical fins extending radially outwardly from a center portion with said helical fins terminating in an outer portion, wherein said outer portion is defined by tabs extending circumferentially from ends of said helical fins, and wherein said center tube includes an annular wall arranged about said center portion with said helical fins extending radially outwardly from said annular wall away from said center portion, such that said center tube outer portions are proximate to said inner edges of said filter media and provides support to the filter media inner edges to maintain the shape of the filter media.

8. The center tube according to claim 7, wherein said center tube has a generally star-shaped cross-section.

9. The center tube according to claim 7, wherein said center tube is plastic.

10. A filter for a fluid system comprising:
a housing having an interior cavity;
a pleated filter media disposed in said interior cavity, said pleated filter media providing inner edges that extend longitudinally and generally parallel with one another to define a central opening; and
a center tube disposed in said central opening, said center tube having a plurality of helical fins extending radially outwardly from a center portion with said helical fins each terminating in an outer portion proximate said inner edges of said pleated filter media, such that said center tube outer portions provide support to said filter media inner edges to maintain the shape of the filter media.

11. The filter according to claim 10, wherein the outer portions engage said inner edges.

12. The filter according to claim 1, wherein the inner edges are arranged radially outwardly of the outer portion.

* * * * *